United States Patent
Greene

(10) Patent No.: US 8,174,363 B2
(45) Date of Patent: May 8, 2012

(54) MULTI-TRANSCEIVER RFID READER SYSTEM WITH CENTRALIZED CONTROL AND FREQUENCY SOURCE

(75) Inventor: John Clay Greene, Allen, TX (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 965 days.

(21) Appl. No.: 12/174,238

(22) Filed: Jul. 16, 2008

(65) Prior Publication Data

US 2010/0013598 A1    Jan. 21, 2010

(51) Int. Cl.
*G08B 21/00* (2006.01)

(52) U.S. Cl. .............. 340/10.1; 340/10.2; 340/10.3; 340/572.1; 342/42; 342/44; 342/454

(58) Field of Classification Search .......... 342/42, 342/44, 454; 340/572, 10
See application file for complete search history.

(56) References Cited

U.S. PATENT DOCUMENTS

| | | | |
|---|---|---|---|
| 5,701,127 A * | 12/1997 | Sharpe | 340/10.2 |
| 2004/0160322 A1 * | 8/2004 | Stilp | 340/572.1 |
| 2008/0079575 A1 * | 4/2008 | Alicot et al. | 340/568.1 |

FOREIGN PATENT DOCUMENTS

| EP | 0694884 A2 | 1/1996 |
|---|---|---|
| WO | 2004/015614 A1 | 2/2004 |

OTHER PUBLICATIONS

Search Report and Written Opinion for PCT/US09/50152, Oct. 16, 2009, European Patent Office as ISA, 13 pages.

* cited by examiner

*Primary Examiner* — Daniel Wu
*Assistant Examiner* — Mark Rushing
(74) *Attorney, Agent, or Firm* — North Weber & Baugh LLP

(57) ABSTRACT

Embodiments of the present invention provide RFID systems having a centralized frequency source and controller. The centralized frequency source generates a reference signal, having a frequency below the RF band of interest, which is transmitted to a plurality of reader nodes. The centralized controller generates and transmits data to the plurality of reader nodes. At each reader node, the reference signal is converted to an RF carrier signal that is modulated and transmitted within corresponding read field of the reader node. This modulated RF carrier signal may interrogate and communicate with one or more RFID tags within this read field. The RF carrier signal may also be held constant to enable communication from RFID tags to the reader node, which is subsequently transmitted back to the centralized controller or processor.

19 Claims, 8 Drawing Sheets

MULTI-TRANSCEIVER RFID READER SYSTEM WITH CENTRALIZED CONTROL AND FREQUENCY SOURCE

BACKGROUND

A. Field of the Invention

The present invention relates generally to the field of Radio Frequency Identification (hereinafter, "RFID") systems, and more particularly to a scalable, multi-transceiver RFID reader system having a centralized control and frequency source.

B. Background of the Invention

The ability to track and monitor goods is an important requirement in the proper management of inventories. RFID systems allow a user to track the location of RFID tags and retrieve certain information about the RFID tag. These RFID tags are typically located on a particular item or group of items, which allows for location tracking of the item(s), and may also provide information about the item(s). For example, an RFID tag may contain an expiration date of an associated item and may transmit this information to an RFID reader in response to an interrogation command. One skilled in the art will recognize that RFID tags may provide numerous types and amounts of information about an associated item.

An RFID reader typically queries an RFID tag by transmitting an interrogation command that specifically identifies one or more tags and which also may request certain information. The appropriate RFID tag(s) respond to the interrogation command by transmitting a response with the appropriate information. In a typical passive RFID system, the RFID tag extracts sufficient power from the read field to enable a response to be generated. This read field is usually generated by modulating an interrogation command onto an RF carrier signal and transmitting the resulting RF signal from the reader. This transmitted RF signal creates an RF field, typically of very limited area, in which a tag can extract power, process the command, and subsequently respond to the command. After transmitting a request, the reader may maintain a constant RF carrier signal to generate an RF field that allows the tag to reply.

FIG. 1 generally illustrates an exemplary multi-transceiver RFID system. A centralized reader device 110 is coupled to multiple read zones 120 that interrogate and communicate with RFID tags. Each of the read zones 120 has an associated read field 130 in which communication between a read zone and tag may occur. Tags outside of the read field 130 are usually unable to reliably communicate with the corresponding read zone. One manner in which this read field may be measured is a radius distance 135 in which the field radially extends from the read zone 120.

Accordingly, in a system employing multiple read zones, an approximate location of an RFID tag may be identified based on which read zone is able to communicate with which tag. This communication from the tag is subsequently provided by the read zone to the centralized reader device 110 for processing.

The accuracy of the RFID system depends on a number of factors including the number of read zones, the interrogation power and corresponding size of the read fields, and the quality of components within the system. For example, certain high frequency (hereinafter, "HF") RFID systems may require RF transmission cabling, multiplexers and other components that are more able to effectively operate within an RF environment. These RF components can be expensive and significantly increase the cost of deploying and maintaining an RFID system. For example, the cost of RF switching components may present a significant deterrent to scaling the number of read zones because multiple RF switches may need to be coupled together to provide sufficient switching capability to address all of the read zones.

One skilled in the art will recognize that the cost of an RFID system may also significantly increase as the number of read zones, and associated RF components, becomes larger. In many instances, the cost of installing and maintaining an RFID system is determinative in whether the system is deployed by a user.

SUMMARY OF THE INVENTION

Embodiments of the present invention provide RFID systems having a centralized frequency source and controller. The centralized frequency source generates a reference signal, having a frequency below the RF band of interest, which is transmitted to a plurality of reader nodes. The centralized controller generates and transmits data to the plurality of reader nodes.

At each reader node, the reference signal is converted to an RF carrier signal that is modulated and transmitted within corresponding read field of the reader node. This modulated RF carrier signal may interrogate and communicate with one or more RFID tags within this read field. The RF carrier signal may also be held constant to enable communication from RFID tags to the reader node, which is subsequently transmitted back to the centralized controller or processor.

In various embodiments of the invention, each reader node comprises a communication and synchronization module. The communication and synchronization module has a frequency multiplier that receives the reference signal and generates an RF carrier by increasing the frequency of the reference signal. In certain embodiments, the frequency multiplier comprises a phased locked loop that applies a frequency multiplication operation to the reference signal. The communication and synchronization module also has a data processing/encoding module that receives the data from the centralized controller and prepares it for modulation. This procedure may include data encoding, such as Manchester encoding, and packetizing this data into RFID tag commands.

A transceiver receives and modulates the RF carrier signal with the digitized data. The modulated carrier signal is subsequently transmitted into the corresponding read field containing the RFID tags.

One skilled in the art will recognize that the local generation of an RF carrier on the reader node obviates the need for RF cabling and components within the system. Additionally, because this RF carrier generation results from a frequency multiplication operation of the reference signal, the need for local frequency oscillators is also removed from the system. One skilled in the art will also recognize that the frequency multiplication operation may be either an application of integer or non-integer scalar. As a result, the cost for deploying and maintaining an RFID system is significantly reduced due to the relative decrease in RF components and/or oscillators within the system. Additionally, the number of reader nodes within the system may be more cost-effectively increased allowing for the interrogation power on each of the reader nodes to be decreased.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. (hereinafter, "FIG.") 1 generally illustrates a multi-read zone RFID system.

DETAILED DESCRIPTION OF THE INVENTION

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Figure 1:
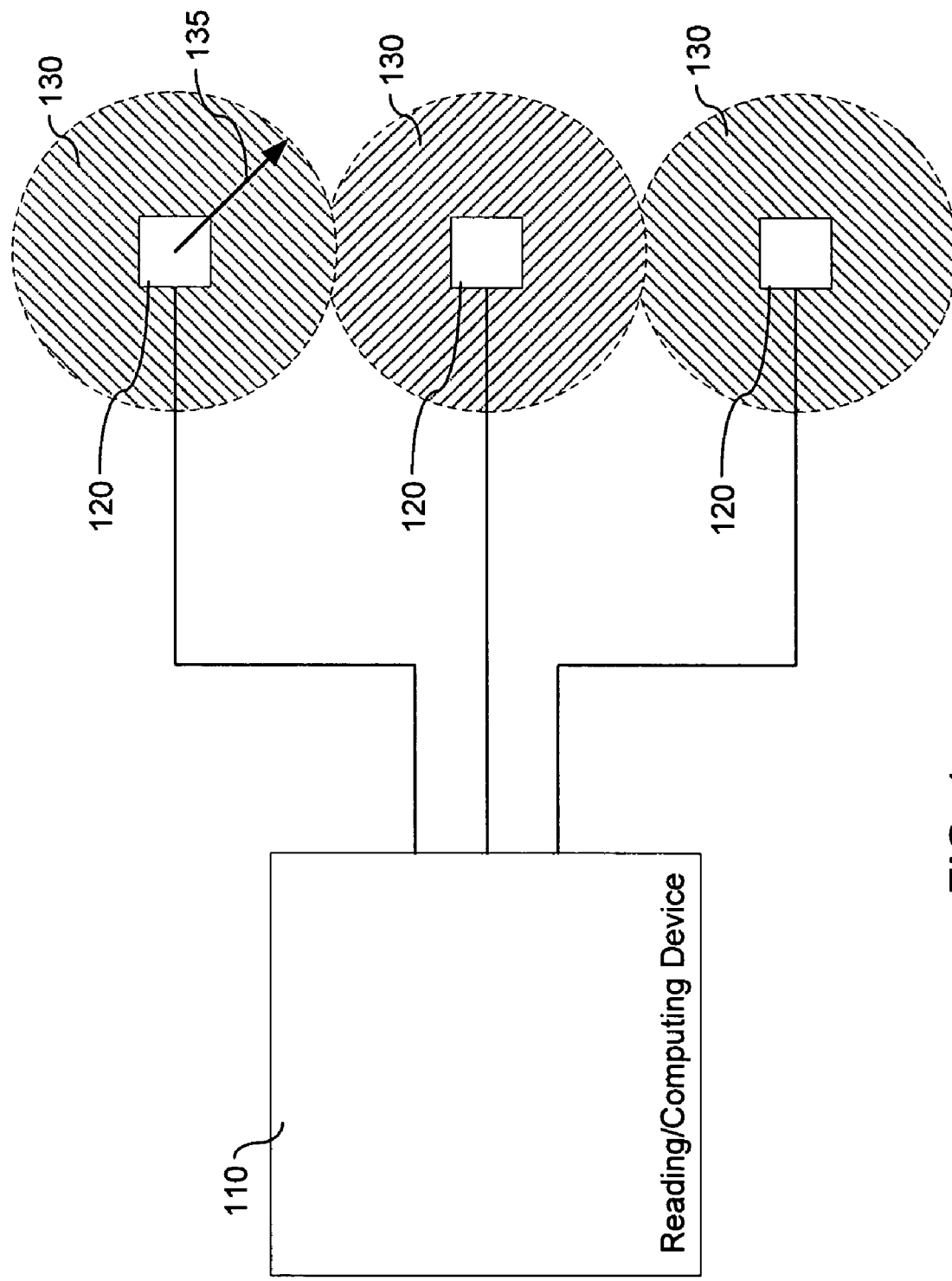
Figure 2:
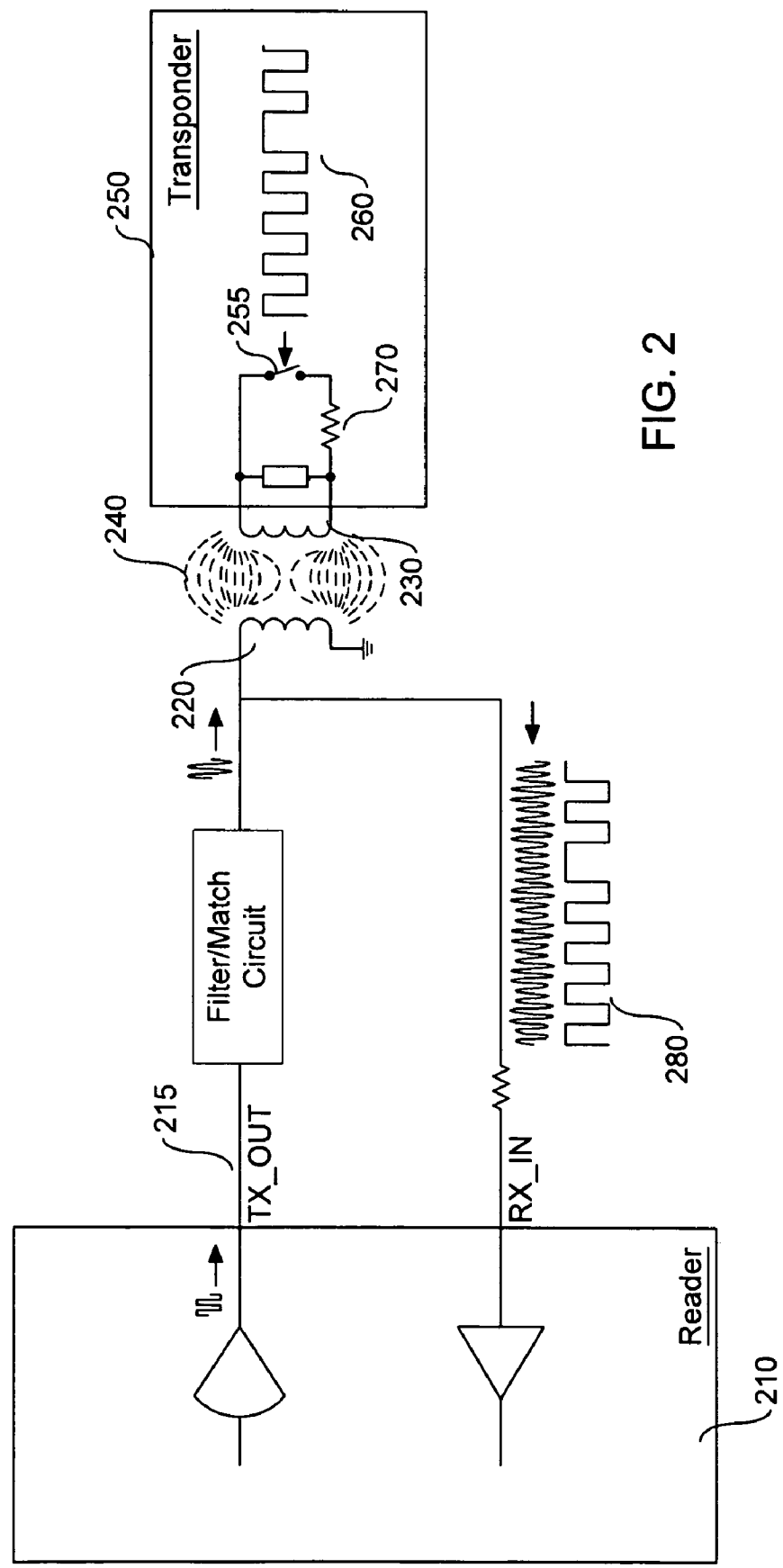
FIG. 2 is a diagram illustrating communication between an HF RFID tag and read zone.

In an HF RFID system, readers modulate RF carrier signals to interrogate and communicate with RFID tags. These modulated RF carrier signals may specifically identify an RFID tag that is being interrogated as well as provide certain information or commands to the tag. Referring to FIG. 2, a reader 210 transmits an output signal (Tx_out) by modulating data onto an RF carrier and transmitting that modulated RF signal into a field containing RFID tags. An antenna 220 transmits this modulated RF signal and effectively creates a field 240 that magnetically couples the reader 210 with an RFID tag 250. This magnetic coupling allows information to be communicated between the two devices. For example, the reader 210 may transmit an output signal that is modulated onto an RF carrier and then subsequently hold the RF carrier constant, which enables the RFID tag 250 to respond using the field generated by the constant RF carrier.

The RFID tag 250 communicates with the reader 210 by changing the impedance or load on its antenna 230 in response to binary data, which changes the current through the antenna 230. For example, the tag 250 may use a switch 255 that changes the load across the antenna 230 in response to a digital data stream 260. Typically, this RFID tag 250 is a passive device that harvests energy from a field 240 that is magnetically coupling the tag 250 with the reader 210 and uses this harvested energy to power its internal components, including the switch 255. As shown in this figure, the switch 255 is able to electrically couple a resistor 270 in parallel with the RFID tag antenna 230, which changes the load on the antenna and the field 240.

This load change on the antenna is propagated through the field 240, which results in this data stream 260 being transmitted from the RFID tag 250 to the reader 210. As a result, the RFID tag 250 is effectively operating as a transponder that changes the field 240 by varying its antenna load or impedance in relation to a bit stream. The received signal 280 at the reader 210 is then provided to a processing device to extract information from the signal. One skilled in the art will recognize the importance of the RF carrier signal in transmitting information from the reader 210 to the RFID tag 250 and maintaining the field 240 which propagates load changes across the tag antenna 230 to the reader 210.

Figure 3:
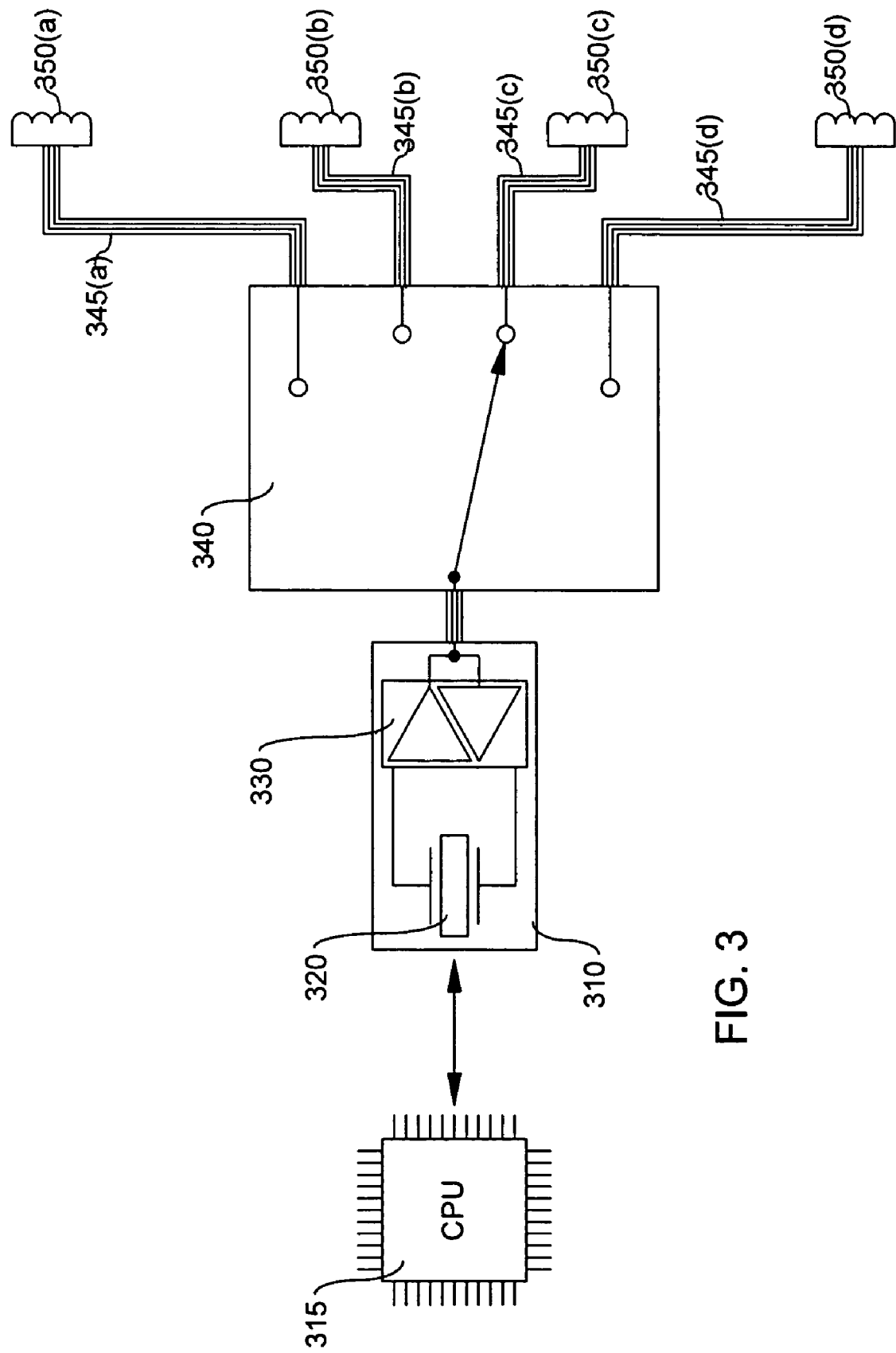
FIG. 3 is a diagram of an HF RFID system having an RF multiplexer directing communication between RFID read zones and a centralized controller.

There are currently two ways in which the RF carrier is generated within the RFID system. FIG. 3 illustrates a first system in which a centralized controller creates a modulated RF signal and an RF multiplexer routes the modulated RF signal to the appropriate read zone. The centralized controller 310 may be coupled to a processor 315 or may include a processor (not shown), which controls the modulation of data onto an RF signal as well as other functionality on the controller 310. The centralized controller 310 comprises a centralized RF frequency source 320 and an RF transceiver 330. The RF frequency source may be an oscillator that generates a carrier signal having a frequency within the RF spectrum. The RF carrier is modulated by the transceiver 330 with data that is communicated to RFID tags as well as used to generate a field that magnetically couples any particular read zone to RFID tags within its corresponding field.

An RF switch or multiplexer 340 physically couples the controller 310 to one or more of a plurality of paths, each of these paths being coupled to a read zone 350(*a-d*). Accordingly, data intended to be transmitted into the field of read zone 350(*a*) is modulated onto the RF carrier signal and switched into an RF cable 345(*a*). Thereafter read zone 350(*a*) transmits the modulated RF carrier signal into its corresponding field.

In this example, each read zone 350(*a-d*) comprises an antenna that transmits data into its corresponding RF field and receives data from an RFID tag(s) located within this field. Each of these read zones 350(*a-d*) is electrically coupled to the switch by a corresponding RF cable 345(*a-d*). This RF cabling communicates RF signals between the read zones 350(*a-d*) and the controller 310 and switch 340. One skilled in the art will recognize that the switch (e.g., RF multiplexer) 340 and RF cabling 345 are relatively expensive components within the system. Accordingly, as the number of read zones increases within the system, the cost of the RF components that support these read zones may significantly increase the cost of deploying the system and replacing these RF components during the operation of the system.

Figure 4:
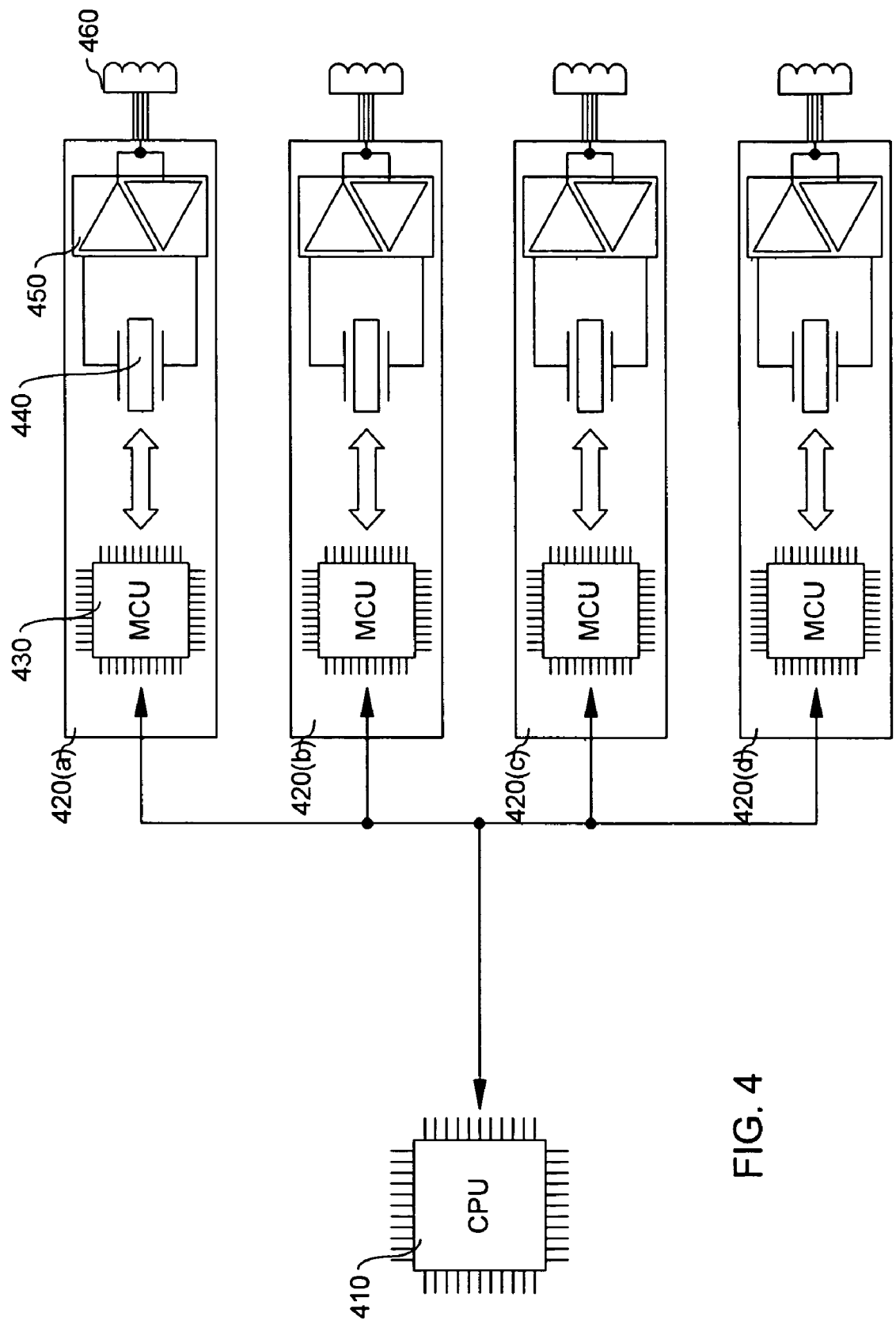
FIG. 4 is a diagram of an HF RFID system having local clock sources on each reader module.

FIG. 4 illustrates another way in which an RF carrier signal is generated within an RFID system. In this example, the RFID system is controlled by a central processor 410 that communicates with the reader modules 420(*a-d*). Each reader module contains a controller unit 430, a local frequency source 440, a transceiver 450 and an antenna 460. The controller unit 430 receives commands from the central processor 410 that relate to communication between the reader module 420 and RFID tags. Additionally, the controller unit 430 processes and forwards data received from RFID tags to the central processor 410.

An RF carrier signal is generated locally on each reader module by a frequency source (i.e., oscillator) 440 that generates a signal having a frequency within the RF spectrum. This RF carrier signal is provided to the transceiver 450 and is used to communicate with the RFID tags. The transceiver 450 modulates information received from the controller unit 430 onto the RF carrier and transmits the modulated RF carrier into the corresponding field of RFID tags. As discussed above, the RF carrier is used to provide a modulated signal to the RFID tags as well as create a field on which load changes on an RFID tag antenna are propagated through the field to the reader module.

One skilled in the art will recognize the cost of providing discrete frequency sources on each of the reader modules. For example, crystal oscillators deployed within the frequency source can be expensive and significantly increase the cost of deploying an RFID system. Accordingly, the cost of increasing the number of reader modules within an RFID system may be too expensive for certain users due to the fact that a local oscillator must be provided on each reader module.

Figure 5:
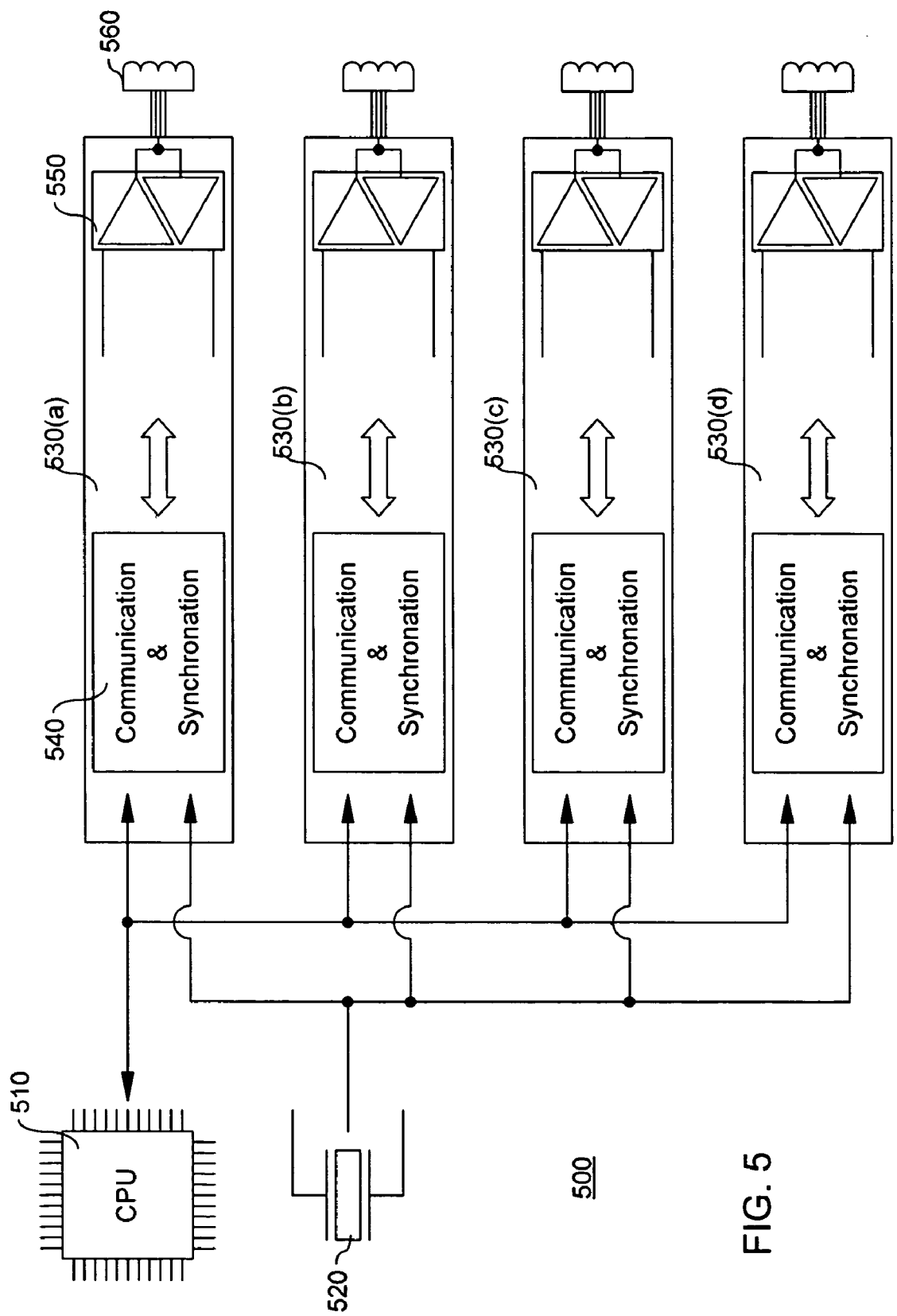
FIG. 5 is a diagram of an RFID system having a centralized control and frequency source for reader nodes according to various embodiments of the invention.

FIG. 5 illustrates an RFID system 500 in which a centralized controller 510 communicates with a plurality of reader nodes according to various embodiments of the invention. The centralized controller/processor 510 transmits commands or information to reader nodes 530(*a-d*) for subsequent transmission to one or more of the RFID tags. In certain embodiments of the invention, the reader nodes 530(*a-d*) receive and reformat these commands and/or information in preparation for transmission to the RFID tags. For example, these commands may be inserted into packets addressing one or more of the RFID tags. The centralized controller/processor 510 also receives information from the reader nodes 530(*a-d*), including information received from RFID tags, and processes this information.

The RFID system 500 also includes a centralized frequency source 520 that generates a reference signal having a frequency below the RF band of interest and transmits this reference signal to each of the reader nodes 530(*a-d*). The frequency of this reference signal is sufficiently low to enable the use of non-RF cabling, such as ribbon cable or flex cable, between the centralized frequency source and the reader nodes 530(*a-d*). In various embodiments of the invention, the frequency of the reference signal is below that of the RF carrier and may be an integer factor of the RF carrier frequency. In other embodiments, the frequency of the reference signal is below that of the RF carrier and is a non-integer factor of the RF carrier frequency. In yet other embodiments, the commands and the reference signal may be combined on a bus between the centralized controller/processor 510, the centralized frequency source 520, and one or more of the reader nodes 530(*a-d*).

This reference signal is received at the reader nodes 530 (*a-d*) and converted to an RF carrier signal by a frequency multiplier locally positioned on the reader node. As will be discussed later, this conversion includes a frequency multiplication operation that effectively increases the frequency of the reference signal into the RF band of interest. The resulting RF carrier signal is modulated with information and transmitted from the reader node to the RFID tags.

In certain embodiments of the invention, each reader node contains a communication and synchronization module 540. The communication and synchronization module 540 has functionality that codes and decodes information between the RFID tags and the centralized controller/processor 510. Additionally, the communication and synchronization module 540 also contains functionality that increases the signal frequency of the reference signal generated by the centralized frequency source 520 into the RF band of interest.

The communication and synchronization module 540 outputs data and an RF carrier signal, both of which are received at a transceiver that modulates the data on the RF carrier signal. This modulated signal is then transmitted by an antenna 560 into the field comprising the RFID tags.

One skilled in the art will recognize that this RFID system obviates the requirement of connecting reader nodes and centralized processors with expensive RF cabling, RF multiplexers or switches and other RF components. Additionally, this RFID system does not require frequency sources, such as oscillators, being located on each reader node; rather, a less expensive frequency multiplier is used on the reader nodes to change the reference signal into an RF carrier signal by increasing its frequency.

In other embodiments of the invention, the reference signal may be generated by the centralized frequency source to be within the RF spectrum. This RF carrier signal is transmitted to the reader nodes and modulated locally on each of the nodes. Furthermore, in yet other embodiments, the RF carrier signal is attenuated in power prior to transmission from the centralized reader device to each of the reader nodes. This attenuated RF carrier signal would generate relatively less radiation but would likely require an amplifier on each of the reader nodes.

Figure 6:
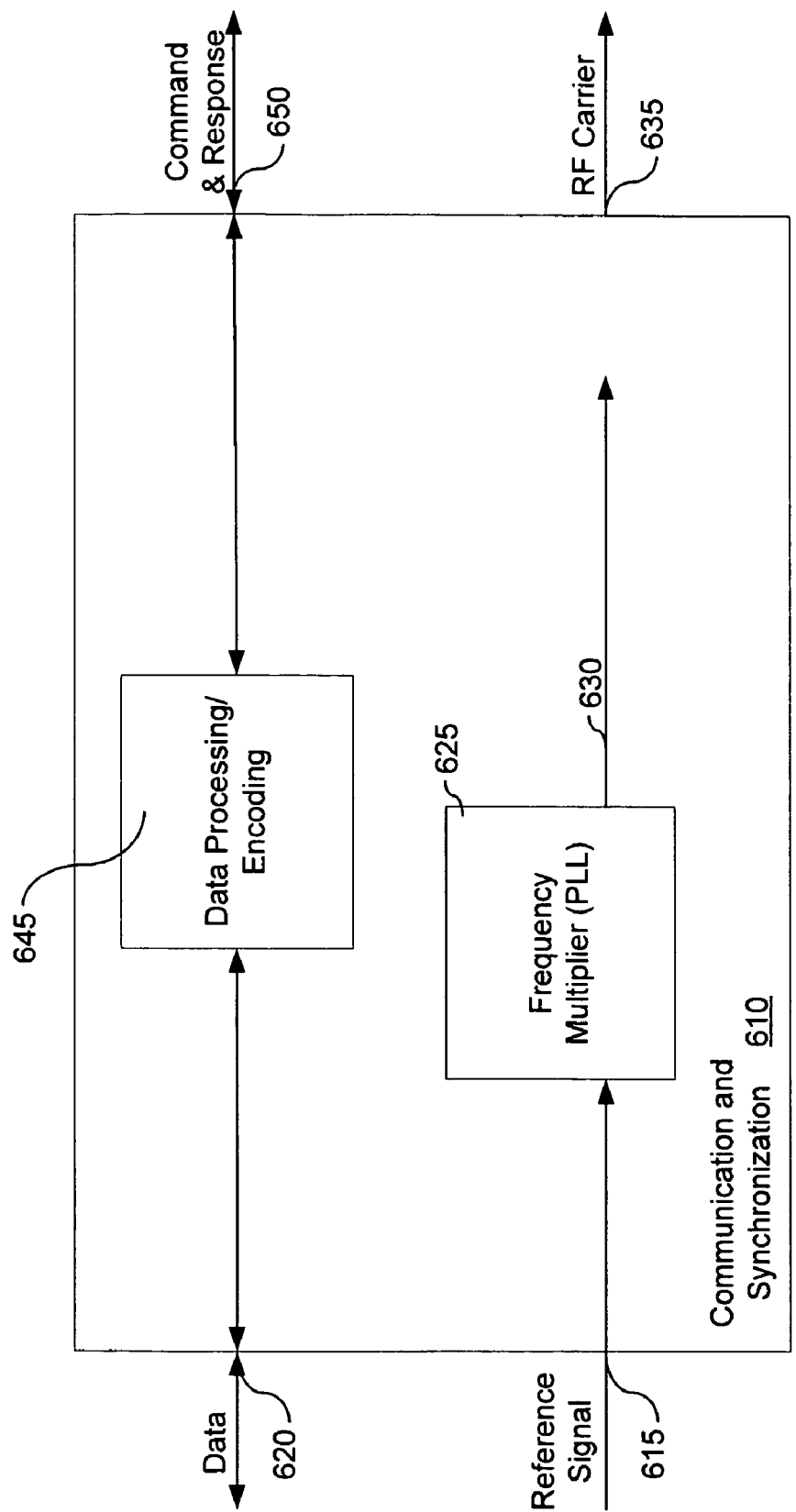
FIG. 6 is a block diagram of a communication and synchronization module located on a reader node according to various embodiments of the invention.

FIG. 6 illustrates an exemplary communication and synchronization module according to various embodiments of the invention. In this example, the communication and synchronization module 610 receives data in a digital data signal at a first input 620 from the centralized controller 510. As previously discussed, this data may include command information for RFID tags, management information for the reader node or other information recognized by one of skill in the art.

A data processing/encoding module 645 receives the digital data and prepares this data for transmission into the field containing the RFID tags. This preparation of data may include various functions including, but not limited to, packetizing the data into commands, encoding the data, or otherwise reformatting the data. This preparation may also include additional encoding of the digital data. The data processing/encoding module 645 outputs commands on a first output 650; these commands are sent to the transceiver for modulation onto an RF carrier signal and eventual transmission into an RFID tag field.

The communication and synchronization module 610 also has a frequency multiplier 625 that increases a relatively lower frequency of the reference signal received from the centralized frequency source to a frequency of an RF carrier signal. In certain embodiments of the invention, the communication and synchronization module 610 has a second input 615 that receives the reference signal from the centralized frequency source. A frequency multiplier 625 scales the frequency of the reference signal to the desired RF carrier frequency. In various embodiments of the invention, a phased locked loop is used to multiply the frequency by a particular scalar resulting in the desired RF signal 630. This RF signal 630 is output on a second output 635 to the transceiver on the reader node so that information may be modulated on it or used to create the RF field used by the RFID tags to communicate with the reader node. One skilled in the art will recognize that the RF signal 630 generated from the frequency multiplier 625 may be further shaped, in various embodiments, prior to modulation by the transceiver.

Figure 7:
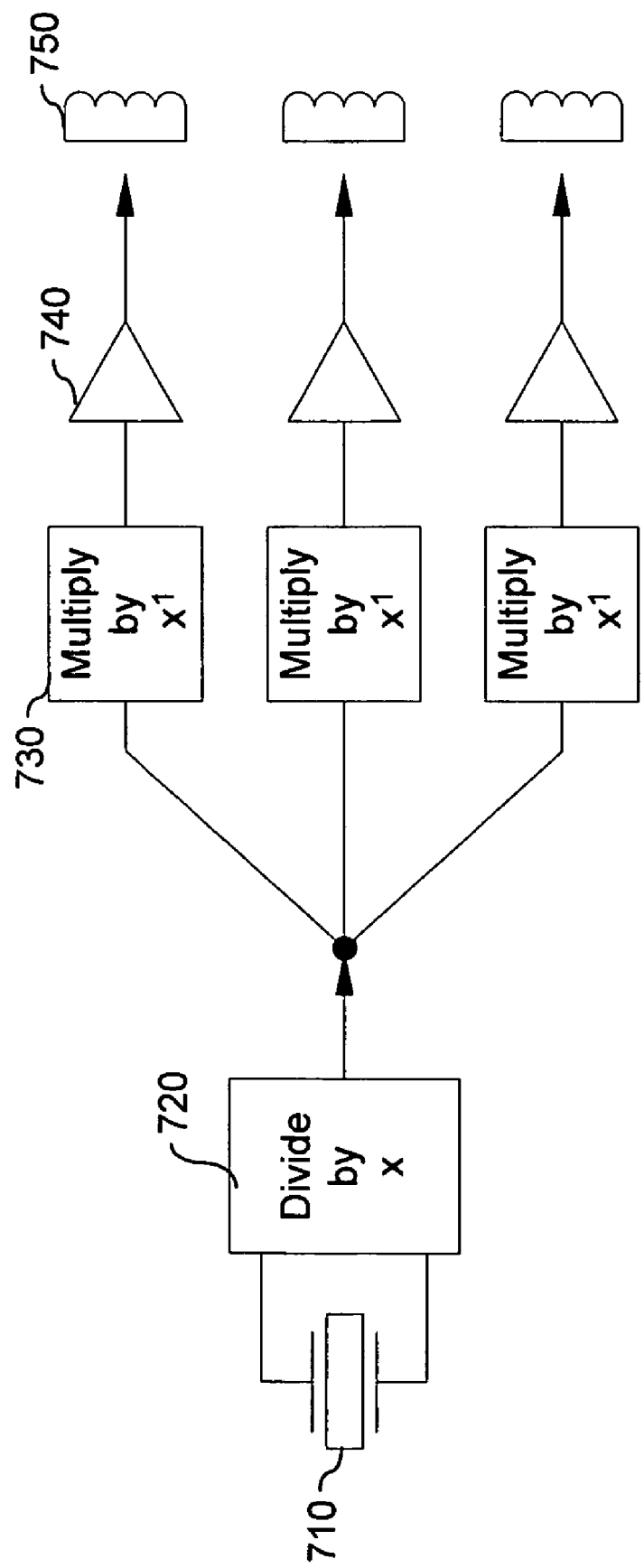
FIG. 7 illustrates a centralized frequency source and frequency multipliers on a plurality of reader nodes according to various embodiments of the invention.

FIG. 7 illustrates an exemplary frequency relationship between the centralized frequency source and the RF carrier signal transmitted from the reader nodes according to various embodiments of the invention. In certain embodiments, a frequency source 710 generates an RF signal on a centralized reader device. The frequency of this RF signal is reduced by a certain scaling factor using a frequency divider 720, which allows the resulting relatively lower frequency signal to be transmitted to the receiver nodes using non-RF cabling and components. This lower frequency signal is the reference signal that was previously discussed. In various embodiments of the invention, this frequency divider 720 comprises a circuit that reduces the frequency by a scaling factor. This scaling factor may be an integer or a non-integer.

In other embodiments of the invention, the frequency source 710 generates a signal with a frequency below the band of interest and transmits this signal to each reader node. As with the other embodiments, this relatively lower frequency signal obviates the need to use RF cabling and components between the central computing device and the reader nodes.

As previously described, the lower frequency reference signal is provided to reader nodes where the frequency of the reference signal is increased to the desired RF carrier frequency. This increase may be performed by applying a frequency multiplication operation 730 on the lower frequency signal. In certain embodiments, this frequency multiplication operation 730 applies an integer scalar and in other embodiments a non-integer scalar is applied. One skilled in the art will recognize that various electrical circuits may be used including a frequency multiplier to increase the frequency of the reference signal into the band of interest.

The resulting RF carrier signal is provided to a transceiver 740 that modulates the RF carrier signal with data, which is provided to an antenna 750 for transmission into the RFID tag field. One skilled in the art will recognize that the frequency of the RF carrier signal may be anywhere within the RF spectrum. Additionally, in some embodiments of the invention, the RF carrier signal may be designed to extend beyond the upper-frequency boundary of the band of interest.

Figure 8:
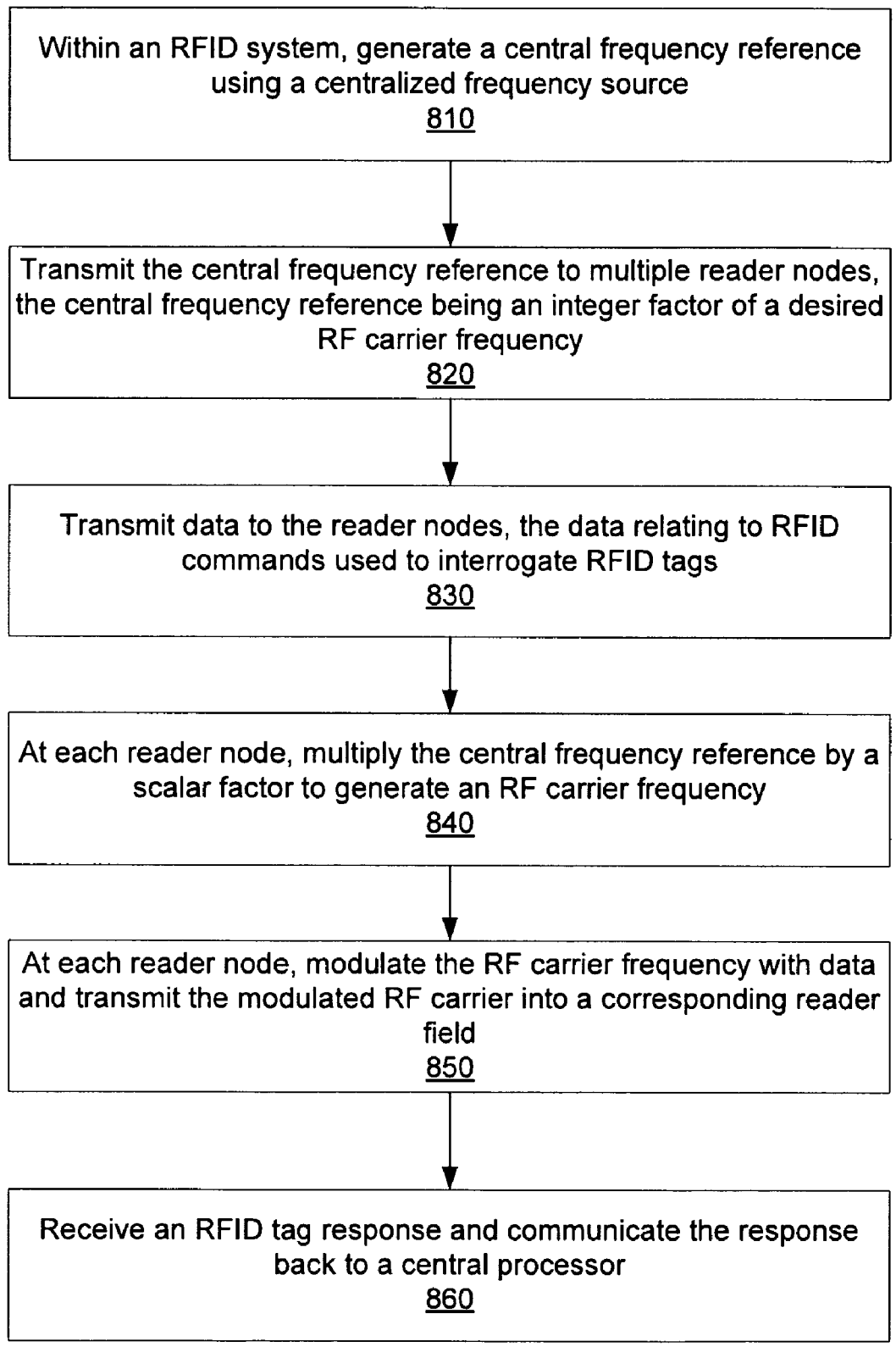
FIG. 8 is a flowchart showing a method for generating an RF carrier signal on a reader node using a centralized frequency source within an RFID system according to various embodiments of the invention.

FIG. 8 illustrates a method, independent of structure, for generating an RF carrier signal within an RFID system according to various embodiments of the invention. A reference signal having a frequency below the RF spectrum is generated 810 by a centralized frequency source. In certain embodiments, the frequency of the reference signal is an integer factor of a desired RF carrier signal. In other embodiments, the frequency of the reference signal is a non-integer factor of the desired RF carrier signal. This reference signal is transmitted 820 to the reader nodes for a subsequent frequency multiplication operation.

A centralized controller, such as one found within a reader device, transmits 830 information to each of the reader nodes. This information relates to commands that are to be transmitted to RFID tags within a corresponding field or fields. In order for these commands to be transmitted, the information is modulated onto an RF carrier signal at one or more reader nodes. This RF carrier signal is generated by multiplying 840 the reference signal, at each reader node, by a scaling factor so that its frequency falls within the RF spectrum.

The RF carrier signal is then modulated with the information 850 received from the centralized controller. This information may have been encoded or packetized within the reader node resulting in RFID interrogation commands and/or other commands for the RFID tags. This modulated RF signal is then transmitted within a corresponding field of the reader node.

In response to commands, RFID tags within the field respond to the reader node using the energy of the field created by the RF carrier signal. As previously discussed, this response may be generated by changing a load on an RFID tag antenna which results in a bit propagating through the field to the reader node. This response is then communicated 860 back to a central processor in the central computing device.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. An RFID system comprising:
   a centralized frequency source that generates a reference signal having a frequency below an RF band of interest, the band of interest having an upper-frequency boundary and a lower frequency boundary;
   a centralized controller that generates a data signal having information related to at least one RFID tag;
   a reader node, coupled to receive the reference signal and the data signal, the reader node comprising:
      a communication and synchronization module that applies a frequency multiplication operation on the reference signal to increase the frequency of the reference signal to generate an RF carrier signal and generates RFID tag commands from the data signal;
      a transceiver, coupled to receive the RFID tag commands and RF carrier signal, the transceiver modulating the RF carrier signal with the RFID tag commands and transmitting the modulated RF carrier signal into a read field.

2. The system of claim 1 wherein the frequency multiplier module comprises a phase locked loop.

3. The system of claim 1 wherein the frequency multiplication operation applies an integer scalar to the frequency of the reference signal.

4. The system of claim 1 wherein the frequency multiplication operation applies a non-integer scalar to the frequency of the reference signal.

5. The system of claim 1 wherein the communication and synchronization module comprises:
   a data processing module, coupled to receive digital data signal from the centralized controller, the data processing module packetizes the digital data signal into a plurality of RFID tag commands.

6. The system of claim 1 further comprising non-RF cabling that couples the centralized frequency source to the reader node.

7. The system of claim 1 wherein the reader node is within a plurality of reader nodes, each reader node within the plurality of reader nodes having a corresponding read field.

8. A method for generating a modulated RF carrier signal within an RFID system, the method comprising:
   generating a reference signal having a frequency below an RF band of interest, the band of interest having an upper-frequency boundary and a lower frequency boundary;
   transmitting the reference signal to a plurality of reader nodes within the RFID system;
   increasing the frequency of the reference signal by applying a frequency multiplication operation to the reference signal resulting in an RF carrier signal, the frequency multiplication operation being performed on a first reader node within the plurality of reader nodes; and modulating the RF carrier signal with data prior to transmission into a read field of the first reader node within the plurality of reader nodes.

9. The method of claim 8 wherein the frequency multiplication operation is performed by a phase-locked loop.

10. The method of claim 9 wherein the frequency multiplication operation applies an integer scalar to the frequency of the reference signal.

11. The method of claim 9 wherein the frequency multiplication operation applies a non-integer scalar to the frequency of the reference signal.

12. The method of claim 8 further comprising the step of:
combining the reference signal and at least one data signal on a bus between a centralized controller and a reader node.

13. The method of claim 8 wherein the step of transmitting the reference signal to the plurality of reader nodes is performed using non-RF cabling.

14. A communication and synchronization device in a reader node within an RFID system, the device comprising:
a data processing module, coupled to receive a digital data signal from a centralized controller, the data processing module formats information within the digital data signal for transmission into a read field of the reader node and outputs a formatted digital data signal; and
a frequency multiplier, coupled to receive a reference signal from the centralized controller having a frequency below an RF band of interest, the band of interest having an upper-frequency boundary and a lower frequency boundary, the frequency multiplier applies a frequency multiplication operation to the reference signal to increase the frequency of the reference signal to fall within the RF band of interest and outputs a corresponding RF carrier signal.

15. The communication and synchronization device of claim 14 comprising:
a first input on which the digital data signal is received and forwarded to the data processing module; and
a second input on which the reference signal is received and forwarded to the frequency multiplier.

16. The communication and synchronization device of claim 14 comprising:
a first output, coupled to the processing module, the first output transmits the formatted digital data signal to a transceiver;
a second output, coupled to the frequency multiplier, the second output transmits the RF carrier signal to the transceiver.

17. The communication and synchronization device of claim 16 wherein the RF carrier signal is modulated with the formatted digital data signal.

18. The communication and synchronization device of claim 14 wherein the frequency multiplication operation applies an integer scalar to the reference signal.

19. The communication and synchronization device of claim 14 wherein the frequency multiplication operation applies a non-integer scalar to the reference signal.

* * * * *